Patented July 19, 1932

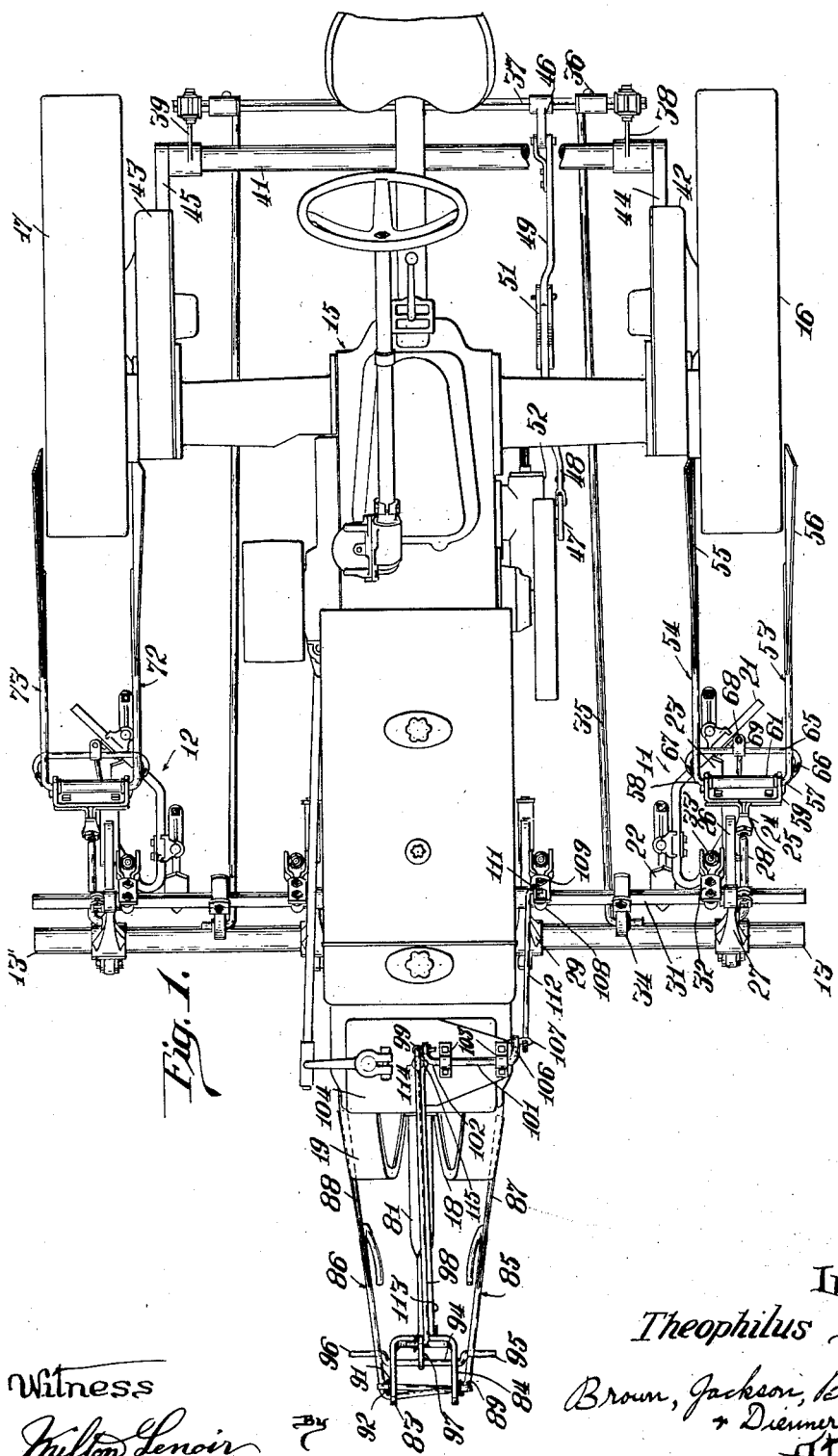

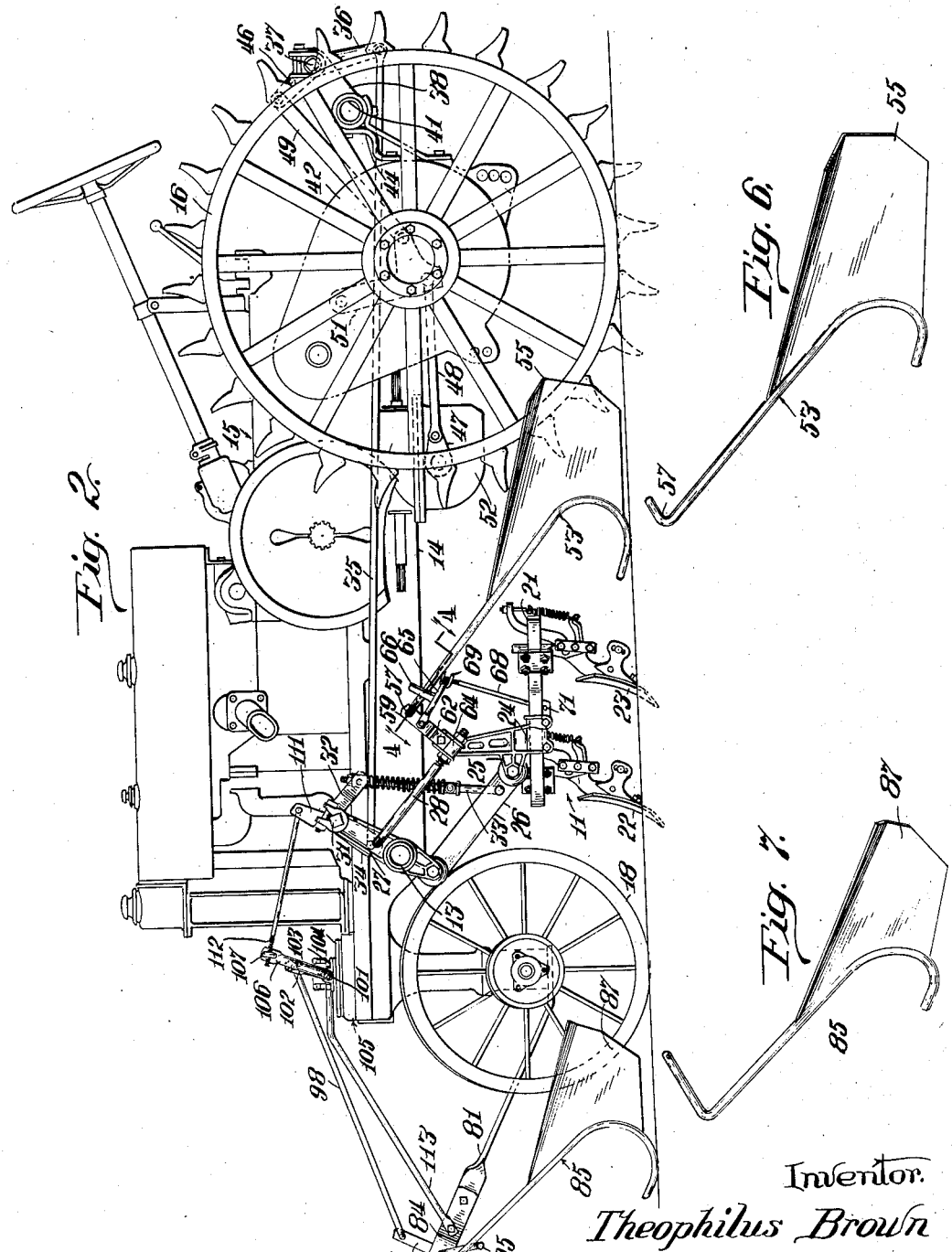

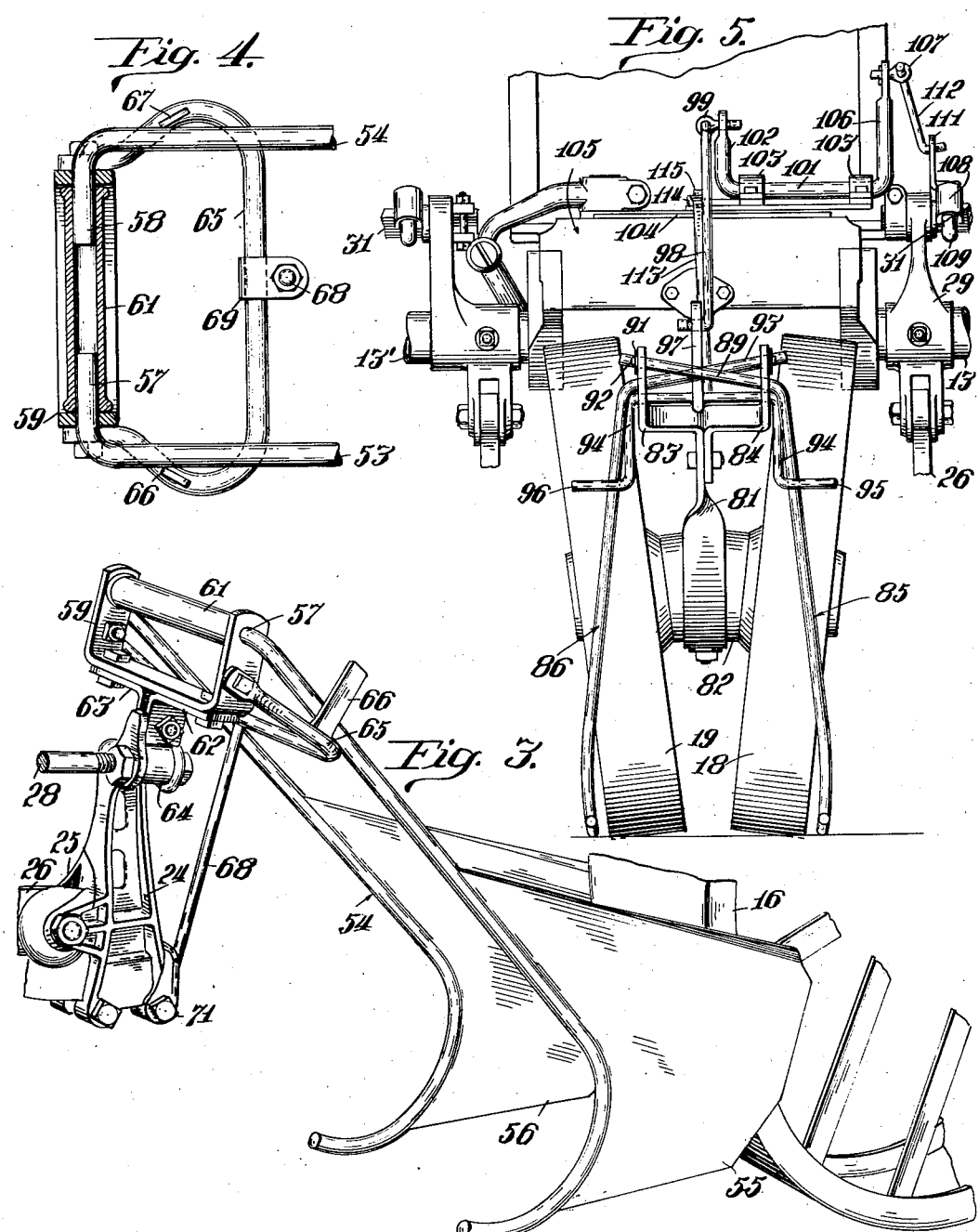

1,868,307

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

CULTIVATOR

Application filed October 13, 1930. Serial No. 488,238.

This invention relates to cultivators and more particularly to a vine lifting means adapted to be associated with a cultivator carried by a tractor which is provided with a suitable power operated raising or lowering mechanism for moving the cultivator into and out of operative positions, the vine lifting means being so associated with the power operated raising and lowering means as to effect corresponding lifting or lowering of the vine lifting means.

It has been found that in the employment of a tractor supported cultivator for cultivating vine crops or plants such for example as potatoes, it is desirable to provide some means associated with each of the tractor wheels for lifting and moving the vines out of the paths of the wheels thereby eliminating crushing of such vines. Inasmuch as tractors are now generally employed for general purposes, it is desirable that such implements as are mounted on the tractor in the nature of attachments be readily attachable and detachable. With this in view, it is a purpose of the present invention to provide such a vine lifting means for each of the wheels of the tractor as will be readily attachable to and detachable from the tractor.

Generally, the invention resides in the provision of a vine lifting means comprising two downwardly extending inclined hook members pivotally supported at a point in advance of each of the wheels with which the means is associated, the lower hook portions resting on the ground in operative position a short distance in advance of the wheels. Each hook member is provided with a slightly flared rearward extension disposed in flanking relation to the respective wheel a sufficient distance to prevent such vines as will be raised and will brush against the outer sides of such extensions from falling back into the path of the oncoming wheel. Inasmuch as inequalities in the ground surface may be encountered on either side of the plant rows, each hook member is mounted for free vertical swinging movement independently of the other to readily accommodate itself to such irregularities of the ground surface.

More specifically, the vine lifting means of the present invention is directed to a novel manner of association with a cultivator or other similar implement supported upon a tractor having rear driving wheels considerably spaced apart and steering wheels proximately disposed with respect to each other and cambered, the cultivator being positioned on the tractor between the driving wheels and steering wheels.

The cultivator is so mounted upon the tractor as to be readily shiftable vertically from ground engaging position to inoperative position and vice versa by a movement such that the shovels are raised or lowered in parallel relation to the horizontal, this being accomplished by a parallel link mounting suitably connected to a rock shaft which in turn is operated by a suitable power operating means deriving its energization from the power plant of the tractor. The cultivator shovels are preferably arranged in flanking relation to the power plant supporting portion of the tractor whereby the cultivator shovels are disposed for operation in the spaces defined by the paths of the driving wheels and the body of the tractor. To prevent vines of plants from being crushed by the rear driving wheels of the tractor, a vine lifting means of the character above briefly described is mounted at the rear end of each cultivator rig in such a manner that the ground engaging portions or the hook portions of the downwardly extending members will, in operative position, engage the ground slightly in advance of each respective wheel with the rearward extensions provided on the hook members flanking the forward side portions of each wheel. Inasmuch as it is desirable that each of the vine lifting means provided for the driving wheels be raised or lowered in conjunction with the corresponding movements of the cultivator means, a suitable means is provided for each vine lifting means permitting in operative position the normal rise and fall of vine lifting means but being adapted upon raising movement of the cultivator rig to engage under the downwardly extending members, thereby elevating the vine lifting means upon elevating movement of the cultivator rig. Thus the power operating means for the cultivators is effective to produce raising and lowering of the vine lifting means for each of the rear driving wheels.

The vine lifting means associated with the front steering wheels of the tractor is supported by an upwardly extending bracket in turn connected to the steering wheel axle housing, the bracket being suitably braced by a rod having pivotal connection with the tractor in a horizontal plane whereby the brace will readily accommodate itself to steering movements of the steering wheels. The supporting bracket is provided with spaced supporting arms in which the hook members are pivoted or journaled for ground engagement in advance of the steering wheels. Inasmuch as the front steering wheels are cambered, the normal rise and fall of the hook members is designed to take place in planes parallel to the planes of the wheels. To this end, each hook member is journaled in the supporting bracket on an axis perpendicular to the plane of its respective wheel. A suitable crank member is journaled in the supporting bracket and is provided with extensions disposed under the hook members, the crank member having a suitable link connection extending back to one of the rock shafts adapted to impart raising and lowering movement to its respective cultivator rig upon energization by the power operating means. Thus when the cultivator rigs are raised or lowered a corresponding motion is imparted to the vine lifting means associated with the front steering wheels.

With the above in view, it is one of the objects of the present invention to provide vine lifting means adapted to be associated with an implement and tractor supporting such implement for moving vines growing close to the ground out of the paths of movement of the tractor wheels.

Another object is the provision of such a vine lifting means as will be rendered operative and inoperative upon corresponding movements of the implement.

A further object is to provide a vine lifting means for proximately disposed cambered steering wheels which will have rise and fall movements in parallel relation to the respective wheels.

Another object is the provision of vine lifting units each comprising a pair of swinging members mounted for independent rise and fall movement with respect to each other for independent accommodation to the irregularities on the surface of the ground.

Other and further objects will appear from the following detailed description of a preferred embodiment of my invention illustrated in the accompanying copies in which:

Figure 1 is a plan view of a tractor and its associated cultivator provided with vine lifting means in accordance with the present invention;

Figure 2 is a side elevation of the arrangement illustrated in Figure 1;

Figure 3 is a perspective view of the vine lifting means associated with one of the rear driving wheels of the tractor;

Figure 4 is a section taken along the line 4—4 of Figure 2 illustrating the journaling arrangement of the upper ends of the vine lifting means for the rear driving wheels;

Figure 5 is an enlarged front elevation of the tractor cultivator and vine lifting means for the steering wheels of the tractor illustrating the connections between the vine lifting means and the raising and lowering rock shaft of one of the cultivator rigs;

Figure 6 is a perspective view of one of the hook members forming the rear driving wheel vine lifting means; and Figure 7 is a perspective view of a similar member comprising the front steering wheel vine lifting means.

It will be understood that while I have illustrated a vine lifting means in association with a shovel cultivator, the vine lifting means may be suitably employed with any implement of similar utility.

In order to more readily acquaint those skilled in the art with the various features of my invention, I shall first describe briefly the cultivator arrangement and the connections thereof with the power operated raising and lowering mechanism.

The cultivator mechanism comprises two similar cultivator means 11 and 12 suitably supported upon two tubular transverse members 13 and 13' supported in alignment from either side of the frame 14 adjacent the forward end thereof of a tractor 15 having widely separated rear driving wheels 16 and 17 and forwardly disposed cambered steering wheels 18 and 19. Inasmuch as the cultivators 11 and 12 are substantial duplicates of each other except that one is right and the other left, I shall limit this portion of the detailed description to the cultivator 11.

Cultivator 11 comprises an oblique U-shaped rig frame 21 the intermediate portion of which supports a shovel 22 while the rearwardly extending leg thereof supports a similar shovel 23. A rig supporting casting 24 is suitably secured at its lower end to the end of the other leg of the rig frame 21 and is provided with a forwardly disposed extension 25 having pivotal connection with a link 26 extending forwardly and upwardly for pivotal connection with the lower end of a supporting bracket 27 suitably secured to the tubular transverse member 13. A link member 28 has pivotal connection with the supporting bracket 27 above the tubular transverse member 13 with its other end suitably adjustably connected to the upper end of the rig supporting casting 24 for pivotal connection therewith. Links 26 and 28 are arranged in parallel relation. A second supporting bracket 29 (see Figures 1 and 5) is also secured to the transverse tubular member 13 adjacent the frame 14 of the tractor, and extends in parallel relation to the bracket 27. A rock shaft 31 is suitably journaled in the upper ends of the brackets 27 and 29 and is of square cross sectional configuration. An arm 32 in the shape of a fork is suitably secured to the rock shaft 31 adjacent the bracket 27 and on the inner side thereof, and has the upper end of a downwardly extending link 33 pivotally connected thereto between the fingers of the forked end thereof, the lower end of link 33 being suitably pivotally connected with link 26 adjacent its pivotal connection with extension 25 of the rig supporting casting 24.

It will be readily seen that upon counter-clockwise rotation of the rock shaft 31 as viewed in Figure 2, arm 32 will impart a vertical translatory motion to the link 33 which in turn will impart raising movement to the rig 21 through link 26 and casting 24. Due to the parallel links 26 and 28, it will be at once apparent that the rig frame 21 will be elevated in parallel relation to the horizontal. Of course, lowering movement of the rig frame 21 will take place in the same parallel relationship.

Referring more particularly to Figures 1 and 2, rock shaft 31 is provided at intermediate points thereof with a forwardly and downwardly extending lever 34 suitably secured thereto and having adjacent its lowermost end and journaled therein one end of a connecting link 35. The other end of link 35 is suitably pivotally connected with a depending lever or arm 36 suitably secured to a rock shaft 37 supported at the rear end of the tractor 15 in brackets 38 and 39 suitably secured to a tubular transverse member 41 supported from the driving wheel axle housings 42 and 43 by means of suitable brackets 44 and 45. Rock shaft 37 also has secured thereto an arm 46 one end of which is connected to a crank arm 47 by means of a link connection comprising two links 48 and 49 the adjacent ends of which are connected to an L-shaped lever 51 which suitably changes the direction of pull of the crank arm 47 to the arm 46.

It will be readily apparent that upon energization of the power takeoff transmission 52, the crank 47 will move links 48 and 49 in a direction through the forward end of the tractor thereby imparting counter-clockwise rotation to arm 46, rock shaft 37, and arm 36 (as viewed in Figure 2), thereby imparting counter-clockwise rotation to the arm 34 associated with the rock shaft 31 through the link 35 whereby the rig frame 21 may be raised as has been heretofore described.

It will be understood of course, that inasmuch as the cultivator 12 is similar in construction to the cultivator 11 excepting that it is the counterpart thereof, its operation is exactly the same as that of cultivator 11.

I shall now describe the vine lifter associated with the rear driving wheel 16. This vine lifter means comprises two lifting hook members 53 and 54 provided adjacent the lower ends thereof with rearwardly extending shields 55 and 56 adapted in operative position of the lifting mechanism to flank opposite sides of the driving or traction wheel (see Figures 1, 2 and 5). The upper end of the hook members 53 and 54 are bent toward each other as indicated at 57 and 58 in Figure 4 and pass through the leg portions adjacent the ends thereof of an inverted U-shaped bracket 59. A sleeve 61 disposed between the leg portions of the bracket 59 embraces the ends 57 and 58 of the hook members 53 and 54 respectively. Bracket 59 is supported by means of two angle members 62 and 63 bolted to an upstanding lug on a sleeve 64 through which link 28 passes and to which the latter is adjustably secured, sleeve 64 being pivotally connected with the upper end of the casting 24. It will be readily apparent that adjustable axial movement of link 28 with respect to the sleeve 64 will permit suitable leveling of the cultivator rig.

Secured to the leg portions of the bracket 59 and adjacent the intermediate portion thereof, is a substantially C-shaped member 65 provided with upstanding arms 66 and 67 each of which engages the outer side of hook members 53 and 54 respectively and retains said members in position. Member 65 is held in position by means of a link 68 which is connected at its upper end to the intermediate portion of member 65 by means of a clip 69 into which it is threaded and at its lower end to the lower end of casting 24 as by means of a bolt 71. It will be seen that with swinging movements of the bracket 59 due to its connection with the sleeve 64, rod 68 will impart a slight swinging movement to the C-shaped or bail member 65. The threaded engagement between the link 68 and clip 69 permits of variation whereby the limit of fall and position of engagement between this member 65 and the vine lifting means for the rear or traction wheels may be readily adjusted.

With the hook members 53 and 54 in ground engaging position as shown in Figure 2, they do not contact the C-shaped member 65 so that they are free to rise over obstructions or fall into depressions except as their downward movement is limited by the position of the C-shaped member 65. When the cultivator 11 is however lifted into inoperative position, the C-shaped member 65 is raised with the rig and the hook members 53 and 54 being thereby contacted by the member 65 will also be raised out of operative or ground engaging position. Thus, upon raising and lowering of the cultivator by its power operating means corresponding movements are imparted to the vine lifting means associated with the driving or traction wheel 16.

Since the vine lifting members 72 and 73 are similarly associated with the cultivator 12, raising or lowering movements imparted to the cultivator 11 will also be imparted to the cultivator 12 and consequently to the vine lifting members 72 and 73. In other words, the vine lifting means associated with each of the rear traction wheels 16 and 17 will be simultaneously actuated to operative or inoperative position according to the desired movements of the cultivators 11 and 12.

Coming now to the vine lifter means provided for the front or steering wheels 18 and 19, reference being had particularly to Figures 1, 2 and 5, this vine lifting mechanism is supported upon a forwardly and upwardly extending bracket 81 suitably bolted to the under side of the front axle 82. The upper end of bracket 81 is offset laterally to form an upstanding arm 83 and an arm 84 of similar structure is bolted to bracket 81. The vine lifting means in this case comprises two hook lifting members 85 and 86 which extend downwardly and rearwardly in proximity to the steering wheels 18 and 19 respectively, each of the hook members being provided at its lower end with a rearwardly extending shield such as 87 and 88 respectively. The steering wheels 18 and 19 are flanked by the shields 87 and 88, shield 87 assuming a position along and in proximity to the outer side of the wheel 18 while shield 88 assumes a similar position on the outer side of wheel 19. The upper end of hook member 85 is bent to provide an angularly disposed portion 89 forming an angle with the main body portion of a member 85 of greater than ninety degrees for a purpose which will presently appear. This angularly disposed end 89 is journaled through the upstanding portion 84 and adjacent the upper end of the upstanding portion 83 being suitably retained against accidental removal by means of a washer 91 and cotter pin 92. The angularity of the portion 89 of hook member 85 is such that the hook member 85 will pivot about an axis which is perpendicular to the plane of the wheel 18. Thus, any rise or fall movement imparted to the hook member 85 will cause the shield 87 to move in a plane parallel to the outer plane of the wheel 18.

Hook member 86 is similarly provided with an angularly disposed portion 93 passing through the upstanding portion 83 and through the upstanding portion 84 adjacent the upper end thereof, the angularity of the portion 93 being such that the hook member 86 will swing about an axis perpendicular to the plane of wheel 19 thereby causing its shield 88 to swing in a plane parallel to the plane of said wheel.

A suitable crank 94 is journaled in the upstanding portions 83 and 84 slightly to the rear of the angularly disposed portions 89 and 93 of the hook members 85 and 86 respectively, and is provided at its end with outwardly extending crank arms 95 and 96 which are normally positioned in the operative positions of the hook members 85 and 86 below such hook members. At its central portion, crank 94 is provided with an upstanding arm 97 which is suitably welded thereto at its center. Arm 97 is connected to an arm 102 of a rock shaft 101 by means of a link 98 having one end thereof suitably offset and journaled in the arm 97 and the other end thereof passing through the eye 99 which is in turn journaled in the arm 102 adjacent the end thereof. Rock shaft 101 is suitably journaled in a pair of journal brackets 103 suitably secured to the cover plate 104 of a steering gear housing 105 adjacent that end of the cover which is disposed in proximity to the bracket 29. Rock shaft 101 is provided at its other end with a second arm 106 through which and adjacent the end thereof is journaled an eye 107. A bracket 108 suitably secured to the rock shaft 31 adjacent the bracket 29 by means of a U-bolt 109 is provided with an upstanding arm 111. This arm 111 is connected to the eye 107 by means of a link 112 having one end thereof threaded into the eye 107 with the other end thereof having an offset portion journaled in the arm 111. By the provision of the threaded connection between link 112 and eye 107, the limits of operative and inoperative positions of the vine lifting means for the dirigible wheels may be varied.

Bracket 81 is braced with respect to the tractor by means of a brace link 113 which is pivotally connected at its lower end with the bracket 81. The upper end of brace link 113 is provided with an angularly disposed portion 114 which is pivotally connected to the cover plate 104 by means of a bolt 115 for pivotal movement in a horizontal plane. Thus as the steering wheels 18 and 19 are turned for steering movements of the tractor, brace link 113 is free to partake of the turning movement of bracket 81 thereby suitably bracing bracket 81 in all desirable steering movements of the wheels 18 and 19.

Referring now to Figure 2, it will be seen that when counter-clockwise movement is imparted to the rock shaft 31 for raising the cultivator 11 from the power operating means, lever 111 will partake of such counter-clockwise movement thereby imparting counter-clockwise movement to the rock shaft 101 through the link 112. Rock shaft 101 will in turn impart a counter-clockwise movement to the arm 97 of the crank 94 through the link 98. Crank 94 will thus partake of the counter-clockwise swinging movement and its crank portions 95 and 96 will engage the under sides of the hook members 85 and 86 respectively and thereby raise such hook members. Thus the vine lifter means for the steering wheels 18 and 19 will partake of the raising and lowering movements of the cultivators 11 and 12. As in the case of the vine lifting means associated with the rear traction wheels 16 and 17, the members 85 and 86 will not contact the crank arms 95 and 96 of the crank 94 when the cultivators 11 and 12 are in lowered or operative position thereby being free to rise over obstructions or fall into depressions independently of each other except as their downward movement may be limited by the position of the crank 94.

It will thus be seen that I have provided a novel arrangement of vine lifting means for all of the wheels of a tractor in association with a cultivator or similar implement carried by such tractor, the arrangement being such that all of the vine lifting means will partake of the raising or lowering movements of the cultivator or other similar attachment. By having the vine lifting means for the rear driving or traction wheels of the tractor associated with the cultivator or other attachment, such vine lifting means may be readily attached to or detached from the tractor with the cultivator or other attachment. The vine lifting means associated with the front or steering wheels of the tractor are readily and simply attached or detached.

The provision of vine lifting means comprising two counterpart hook members having independent rise and fall movement to accommodate themselves independently to the irregularities on the surface of the ground is believed to be novel.

While I have shown and described a preferred embodiment of my invention, it will be understood that I do not wish to be limited thereto inasmuch as certain changes may be made therein by those skilled in the art without departing from the essence of the invention or the spirit and scope of the appended claims.

What I claim and desire to secure by Letters Patent is:

1. In combination, a tractor having driving wheels, an implement carried by said tractor, and vine lifting means carried by said implement to move vines growing in proximity to the ground out of the paths of said driving wheels, each comprising a pair of parallel members.

2. In combination, a tractor having driving wheels, an implement carried by said tractor, and vine lifting means associated with said implement to move vines growing in proximity to the ground out of the paths of said driving wheels, each comprising a pair of independently movable members, each adapted to accommodate itself to the contour of the ground.

3. In combination, a tractor having driving wheels, an implement carried by said tractor, and vine lifting means associated with said implement to move vines growing in proximity to the ground out of the paths of said driving wheels, each comprising a pair of independently movable members flanking each of said wheels, each member being adapted to freely accommodate itself to the contour of the ground.

4. In combination, a tractor having driving wheels, an implement carried by said tractor, vine lifting ground engaging means carried by said implement to move vines growing in proximity to the ground out of the paths of said driving wheels, means for raising and lowering said implement by the power of the tractor, and means connected with said prior means whereby said vine lifting means may be automatically raised upon raising of said implement.

5. In combination, a tractor having a driving wheel, an implement carried by said tractor, vine lifting means carried by said implement in advance of said wheel comprising independently movable members straddling said wheel and adapted to independently ride along the ground to accommodate themselves to irregularities in the ground, and means carried by said implement adapted, upon raising movement of said implement to inoperative position, to engage and elevate said members to inoperative position.

6. The combination with a tractor having driving and steering wheels, of vine lifting means carried by said tractor in advance of said wheels comprising downwardly and rearwardly extending members, and rearwardly extending shields carried by said members and flanking said wheels.

7. The combination with a tractor having driving and steering wheels, of vine lifting means carried by said tractor in advance of said wheels comprising downwardly and rearwardly extending ground engaging members, and rearwardly extending shields carried by said members and flanking said wheels.

8. The combination with a tractor having driving and steering wheels, of vine lifting means carried by said tractor in advance of said wheels comprising downwardly and rearwardly extending members having hook-shaped ground engaging portions, said portions presenting themselves forwardly, and rearwardly extending shields carried by said members and flanking said wheels.

9. The combination with a tractor having a cambered dirigible wheel, of vine lifting means associated with said wheel for engaging the ground in advance of said wheel, said means being mounted for up and down movement in a plane parallel to the plane of the wheel.

10. The combination with a tractor having a pair of proximately disposed cambered steering wheels, of vine lifting means disposed for ground engagement in advance of said wheels and having pivotal movement in planes parallel to the planes of said wheels.

11. The combination with a tractor having proximately disposed steering wheels supported by an axle, of vine lifting means associated with said wheels and means carried by said axle for supporting said vine lifting means.

12. The combination with a tractor having proximately disposed steering wheels supported by an axle, of vine lifting means associated with said wheels, means carried by said axle for supporting said vine lifting means, and means bracing said last named means with respect to said tractor.

13. The combination with a tractor having proximately disposed steering wheels supported by an axle of vine lifting means associated with said wheels, means carried by said axle for supporting said vine lifting means, and means bracing said last named means with respect to said tractor and having pivoted connection with said tractor to accommodate itself to steering movement of said wheels.

14. The combination with a tractor having driving wheels and steering wheels, an implement carried by said tractor and power driven means for elevating and lowering said implement to inoperative and operative positions, of vine lifting means comprising a pair of parallel members and associated with said driving wheels and steering wheels so as to accommodate themselves to irregularities in the ground, said power driven means being effective to raise or lower said vine lifting means.

15. The combination with a tractor having driving wheels and steering wheels, an implement carried by said tractor and power driven means for elevating and lowering said implement to inoperative and operative positions, of vine lifting means comprising a pair of parallel members and associated with said driving wheels and steering wheels so as to accommodate themselves to irregularities in the ground, said power driven means being effective to raise or lower said vine lifting means simultaneously with the raising or lowering movement of said implement.

16. The combination with a tractor having driving wheels and steering wheels, an implement supported by said tractor and power driven connections for raising or lowering said implement, of vine lifting means carried by said implement for moving vines growing close to the ground out of the paths of said driving means, vine lifting means carried by said tractor for moving vines growing close to the ground out of the paths of said steering wheels, said driving wheel vine lifting means being adapted to be raised or lowered with corresponding movements of said implement, and connections between said steering wheel vine lifting means and said power driven connections for raising or lowering said last named vine lifting means with corresponding movements of said implement.

17. The combination with a tractor having proximately disposed steering wheels supported by an axle, an implement supported by said tractor and power driven connections including a rock shaft for raising or lowering said implement, of a supporting bracket carried by said axle, a pair of vine lifting means pivotally carried by said bracket, a swinging member carried by said bracket and adapted to engage said arms for raising movement thereof, and connections between said member and said rock shaft for effecting raising and lowering movements of said arms with corresponding movements of said implement.

18. The combination with a tractor having proximately disposed cambered steering wheels supported by an axle, an implement supported by said tractor and power driven connections including a rock shaft for raising or lowering said implement, of a supporting bracket carried by said axle, a pair of vine lifting arms pivotally carried by said bracket and having ground engaging portions flanking the outer sides of said steering wheels and portions journaled in said bracket on axes perpendicular to the planes of the respective steering wheels, a brace member for said bracket pivotally connected to said tractor to accommodate itself to steering movements of said steering wheels, and connections between said arms and said rock shaft for raising and lowering said arms with corresponding movements of said implement.

19. The combination with a tractor having proximately disposed cambered steering wheels supported by an axle, an implement supported by said tractor and power driven connections including a rock shaft for raising or lowering said implement, of a supporting bracket carried by said axle, a pair of vine lifting arms pivotally carried by said bracket and having ground engaging portions flanking the outer sides of said steering wheels and portions journaled in said bracket on axes perpendicular to the planes of the respective steering wheels, a swinging member journaled in said bracket and adapted to engage said arms for raising movement thereof, a brace member for said bracket pivotally connected to said tractor to accommodate itself to steering movements of said steering wheels, and connections between said swinging member and said rock shaft for raising and lowering said arms with corresponding movements of said implements.

20. A vine lifter means for moving vines growing close to the ground out of the path of a wheel, comprising a pair of swinging arms having ground engaging portions and extensions adapted to flank the wheel, said arms being mounted for independent swinging movement whereby in operative relation each will accommodate itself to irregularities in the ground.

21. Vine lifting means adapted to be carried by a tractor having a ground engaging wheel, comprising a support, a pair of ground engaging members pivotally associated with said support, means carried by said support and adapted to engage and raise said members, and means carried by said means for guiding said members in operative planes parallel to the plane of said wheel and for maintaining the pivotal association of said members and support.

22. Vine lifting means adapted to be carried by a tractor having a ground engaging wheel, comprising a support, a pair of downwardly inclined ground engaging members pivotally associated with said support at their upper ends, and freely removable from said support, shields carried by said members and flanking said wheel, a bail member carried by said support and adapted to engage and raise said ground engaging members to inoperative position, and means carried by said bail member for guiding said ground engaging members in the operative positions thereof whereby said shields are guided in operative planes parallel to the plane of said wheel, said means being also adapted to maintain the assembled relation of said ground engaging members with said support.

23. A vine lifter for a wheel of a vehicle to move vines growing in proximity to the ground out of the path of the wheel, comprising a pair of rearwardly extending independently movable shields mounted to accommodate themselves to the contour of the ground.

24. A vine lifter for a wheel of a vehicle to move vines growing in proximity to the ground out of the path of the wheel, comprising a pair of rearwardly extending independently movable parallel shields mounted to accommodate themselves to the contour of the ground.

25. The combination with a tractor having dirigible and driving wheels, of vine lifting means for said wheels comprising rearwardly extending parallel ground engaging shields mounted for rise and fall movement in operative position to accommodate themselves to the contour of the ground.

26. The combination with a tractor having a power take-off means, and dirigible and driving wheels, of vine lifting means for said wheels comprising rearwardly extending parallel ground engaging shields mounted for rise and fall movement in operative position to accommodate themselves to the contour of the ground, and means connecting said shields with said power take-off for effecting raising and controlling lowering of said shields out of and into operative position by the power of the tractor.

27. The combination with a tractor having a power take-off means, and steering and driving wheels, of ground engaging vine lifting means for said wheels comprising rearwardly extending parallel shields mounted for rise and fall movement in operative position, and means connecting said shields with said power take-off for raising said shields into inoperative position by power from the tractor, the steering wheel shields being mounted for independent rise and fall movement.

28. The combination with a tractor having a power lift means, and driving wheels, of vine lifting means for said wheels and adapted to ride on the ground comprising rearwardly extending shields mounted for rise and fall movement in operative position, and means connecting said shields with the power lift for effecting simultaneous raising thereof by power from the tractor.

29. A vine lifter for a wheel of a vehicle to move vines in proximity to the ground out of the path of the wheel, comprising a downwardly and rearwardly inclined hook member provided with a rearwardly extending shield flanking the wheel with which it is associated.

30. The combination with a tractor having dirigible and driving wheels, of vine lifting means for said wheels comprising a downwardly and rearwardly inclined hook member provided with a rearwardly extending shield flanking the wheel with which it is associated and mounted to ride on the surface of the soil for rise and fall movement in operative position to conform to the contour of the soil.

31. A vine lifter for a wheel of a vehicle to move vines growing in proximity to the ground out of the path of the wheel, comprising a downwardly and rearwardly inclined hook member provided with rearwardly inclined parallel shields each flanking a side of the wheel with which associated.

32. The combination with a tractor having dirigible and driving wheels, of vine lifting means for said wheels comprising downwardly and rearwardly inclined hook members provided with rearwardly inclined parallel shields flanking the wheel with which associated, and mounted for independent rise and fall movement in operative position.

33. The combination with a tractor having dirigible and driving wheels, of vine lifting means for said wheels comprising downwardly and rearwardly inclined parallel hook members adapted to ride over the ground and provided with rearwardly extending shields flanking the wheel with which it is associated.

34. A vine lifter for a wheel of a vehicle to move vines growing in proximity to the ground out of the path of the wheel, comprising downwardly and rearwardly inclined parallel hook members adapted to ride over the ground and provided with rearwardly extending shields flanking the wheel with which associated, said hook members being mounted for independent rise and fall movement in operative position.

35. The combination with a tractor having a power take-off, and steering and driving wheels, of vine lifting means for said wheels comprising downwardly and rearwardly inclined ground engaging hook members provided with rearwardly extending shields flanking the wheel with which associated, and means connecting said vine lifting means with said power take-off for effecting raising thereof out of operative position by the power of the tractor.

36. The combination with a tractor having a power take-off mechanism, and driving wheels, of vine lifting means for said wheels comprising downwardly and rearwardly inclined ground engaging hook members adapted to rise and fall in riding over the ground and each provided with a rearwardly extending shield flanking the wheel with which associated and in parallel relationship with that wheel, and means connecting said vine lifting means with said power take-off for effecting raising thereof by power from the tractor.

In witness whereof, I hereunto subscribe my name this 8th day of October, 1930.

THEOPHILUS BROWN.